United States Patent [19]

Lichfield

[11] Patent Number: 4,529,018
[45] Date of Patent: Jul. 16, 1985

[54] METHOD AND APPARATUS FOR INFLATING BALLOONS AND FOR DEPLOYING A LOAD SUSPENDED THEREFROM

[75] Inventor: Ernest W. Lichfield, Boulder, Colo.

[73] Assignee: University Corporation of Atmospheric Research, Boulder, Colo.

[21] Appl. No.: 624,394

[22] Filed: Jun. 25, 1984

[51] Int. Cl.$^3$ .............................. B64B 1/40; B64B 1/64
[52] U.S. Cl. ...................................... 141/4; 242/54 R; 244/1 TD; 244/31
[58] Field of Search ........................ 141/4, 94, 98, 114; 182/49, 73, 74, 75, 236, 241; 242/54 R; 244/1 TD, 31, 33; 446/224, 248, 249, 250, 251

[56] References Cited

U.S. PATENT DOCUMENTS 2,758,803  8/1956  Winzer ................................. 244/31
4,034,501  7/1977  Zeyra .................................. 446/224

Primary Examiner—Stephen Marcus
Assistant Examiner—Mark Thronson
Attorney, Agent, or Firm—Edwin L. Spangler, Jr.

[57] ABSTRACT

A balloon-inflation and load-lowering device which comprises an inverted cup-shaped member containing one or more side-opening ports operative when covered by the neck of a balloon to cooperate therewith and form a one-way valve effective to trap the lifting gas inside the balloon once the latter is inflated and the inflation pressure released. Spaced-parallel disk-supporting arms journal a shaft mounting a notched disk. A load-letdown device is operative to slowly lower a load to the end of a tether. The invention further comprises the method of deploying a load suspended beneath a balloon which includes the steps of inflating the balloon, removing the pressure from the balloon allowing the expanded neck thereof to collapse and seal the pressurizing gas therein, attaching the ends of a shaft mounting a notched disk for rotation about a substantially horizontal axis between said arms, attaching one end of a load-supporting tether to the shaft wrapping the tether clockwise one or more turns around the shaft on one side of the disk, then passing the tether through the notch and taking one or more turns anti-clockwise around the shaft on the opposite side of the disk, and alternately repeating the aforementioned sequence until the free end of the tether terminates adjacent the disk, and attaching a load to the free end of the tether such that upon release of the load to fall freely it will pull upon the tether and cause the disk to flip-flop back and forth to slowly unwind off the shaft and lower the load.

11 Claims, 4 Drawing Figures

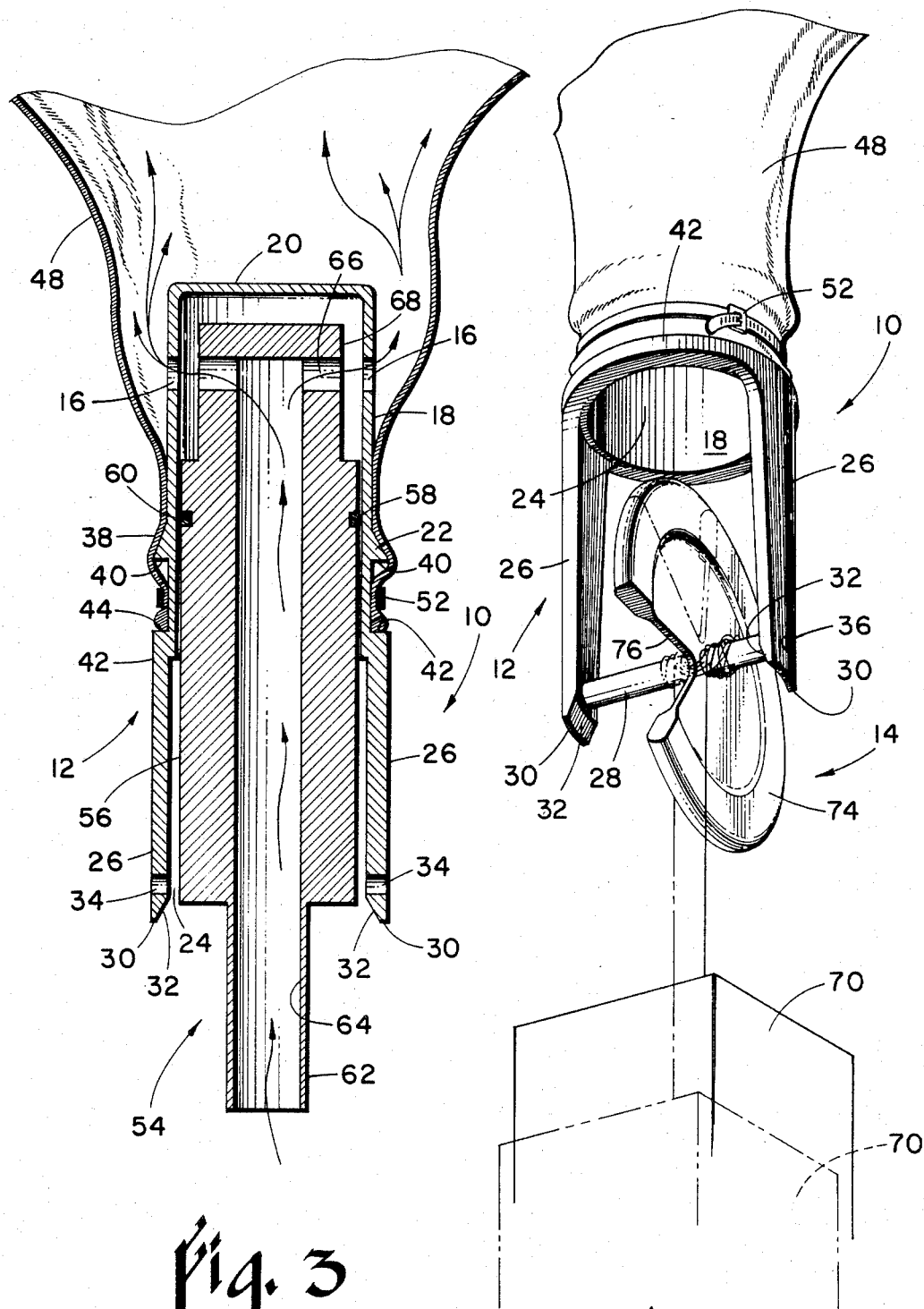

METHOD AND APPARATUS FOR INFLATING BALLOONS AND FOR DEPLOYING A LOAD SUSPENDED THEREFROM

It has been common practice for some forty years to launch balloons for making meteorological observations in much the same way, specifically, by first forcing a lifting gas under pressure into the balloon using a nozzle of some sort inserted into the neck. Next, the gas is sealed in the balloon by tying a piece of string around its neck. When ready for launch, two people are very often required, one to release the balloon and a second to run along with the sonde and release it under the balloon after the latter has reached an altitude at which the sonde will clear the ground.

Unfortunately, under certain conditions, such as high winds, the aforementioned launching technique all too often results in the sonde striking the ground and becoming damaged. Moreover, the extra person required makes the whole procedure very labor-intensive and more costly than necessary.

Some of these balloons are launched inside tubes which makes tying off the neck a real problem as would be the case in almost any confined area. After this is done, attaching the sonde becomes even more difficult. If a letdown unit is installed between the balloon and the load, it, too, creates further complications.

Furthermore, the longer the tether, the more difficult it becomes to launch a flight train, even a simple one; yet, in order to minimize turbulent flow which can have an adverse effect upon the sonde sensors, most meteorological soundings require that the sonde ride beneath the balloon some thirty-five meters. It is, obviously, quite difficult to handle a tether of this length without it tangling, especially under adverse weather conditions.

Weight and bulk are always a problem in connection with high-altitude balloon studies and, therefore, many of the prior art one-way valves and load-lowering devices would be most unsatisfactory for this particular application. Simplicity is essential also, especially if the inflation, launch and deployment of the load are to be accomplished by one person.

One-way valves of the type forming an integral part of the combination device herein described and claimed have been used in much the same form for many years as a bicycle tire inflation fitting. In such an application, a cup-shaped plug with one or more holes in the side is employed to seal a stretchable elastic neck forming the air intake into a bicycle tube, the neck, obviously, sealing off the opening in the plug during normal use. Upon inflation, on the other hand, the neck expands due to its elasticity thus allowing air to enter the tube.

As is the case with the one-way valve described above, there are other load-lowering devices designed for the specific purpose of lowering a sonde or similar piece of equipment suspended from a balloon to the end of a tether at a controlled rate. Applicant is aware of three such devices; however, none of the three operates in the way his does.

Specifically, the U.S. Western Service employs an all-metal device which it calls a "flight train regulator" to deploy the sonde. In principle, the unit operates much like a pendulum clock since the weight of the sonde as it pulls on its tether produces torque on a spool upon which the tether is wound while the rate at which the spool is allowed to turn is controlled by a pendulum and escapement subassembly very similar to the mechanism in a clock that is driven by wind-up weights.

Viasala of Helsinki, Finland manufactures a very sophisticated letdown device that operates upon the principle of a centrifugally-braked spool that holds the tether. More specifically, a gear train is employed to speed up the revolution rate of the spool. A disk inside a housing is operatively associated with the spool and once the latter exceeds a predetermined speed, brake shoes spring-loaded toward the center of the disk are whirled outwardly against the housing as the centrifugal forces acting thereon overcome the spring bias that normally maintains the shoes disengaged. While offering very precise speed control, so precise in fact that it is used to commutate the radio sonde, it, nevertheless, is bulky, complex and quite expensive when compared with applicant's combination inflation and letdown device.

The third of the three letdown devices is also manufactured by Viasala and is far simpler, lighter, more compact and less expensive than the one just described; however, it lacks the precision of its more sophisticated counterpart. It consists of a more or less trapezoidal-shaped flat plastic member with a side-opening serrated notch along the top edge that receives the neck of the balloon preparatory to tying it off. The string or tether is wound laterally around the body of the plastic member starting at the wider lower end and ending at the top where the neck of the balloon is tied off. The sonde is tied to the lower end of the tether and as the latter is unwound off the plastic member, it causes it to oscillate back and forth with a pendulum-like action. Small bumps or protrusions along the side margins of the unit cause the tether to hang-up momentarily until the device swings away from that edge and thus permits the tether to release from the bump it is caught upon.

Applicant has discovered that he can combine a simple valved inflation device with a unique letdown device that functions on a flip-flop principle and thus simultaneously solves the previously mentioned balloon launching the sonde deployment problems that have plagued meteorologists and others involved with weather forecasting and allied disciplines for years. The method of inflating and sealing the gas in the balloon, while based upon an old technique is, nevertheless, an ideal solution since it is simple, can be accomplished by one person without assistance and, at the same time, virtually does away with the problems customarily associated with tying off the balloon to seal the lifting gas inside thereof. Moreover, once inflated and sealed off, the very same valved inflation tool becomes the supporting structure for a notched disk or flywheel that constitutes the letdown device and which is unique in its flip-flop action to deploy the tether at a controlled rate.

It is, therefore, the principal object of the present invention to provide a novel combination balloon-inflation and load-deployment apparatus.

A second objective is the provision of a novel method for filling a balloon, sealing the lifting gas inside thereof and gradually letting down a load fastened thereto down to the end of a tether that utilizes the aforementioned combination apparatus.

Another objective of the invention herein disclosed and claimed is to provide an apparatus of the type described which is automatic in terms of its gas admission, sealing and load-deployment functions.

Still another objective is the provision of a device for lowering a load from an elevated position that is self-contained and gravity-operated.

An additional object is that of providing a combination balloon-inflation and load-letdown fixture that can be operated by one person even under adverse weather conditions.

Further objects are to provide a device of the character described which is simple, easy to use, lightweight, compact, versatile, reliable and even somewhat decorative.

Other objects will be in part apparent and in part pointed out specifically hereinafter in connection with the description of the drawings that follows, and in which:

FIG. 3 is a diametrical section showing the one-way valve in the balloon neck and the inflation nozzle detachably connected into said valve; and, FIG. 4 is a perspective view much like FIG. 1 and to the same scale showing the valve fitted with the load-letdown notched flywheel and associated tether.

Figures 1, 2:
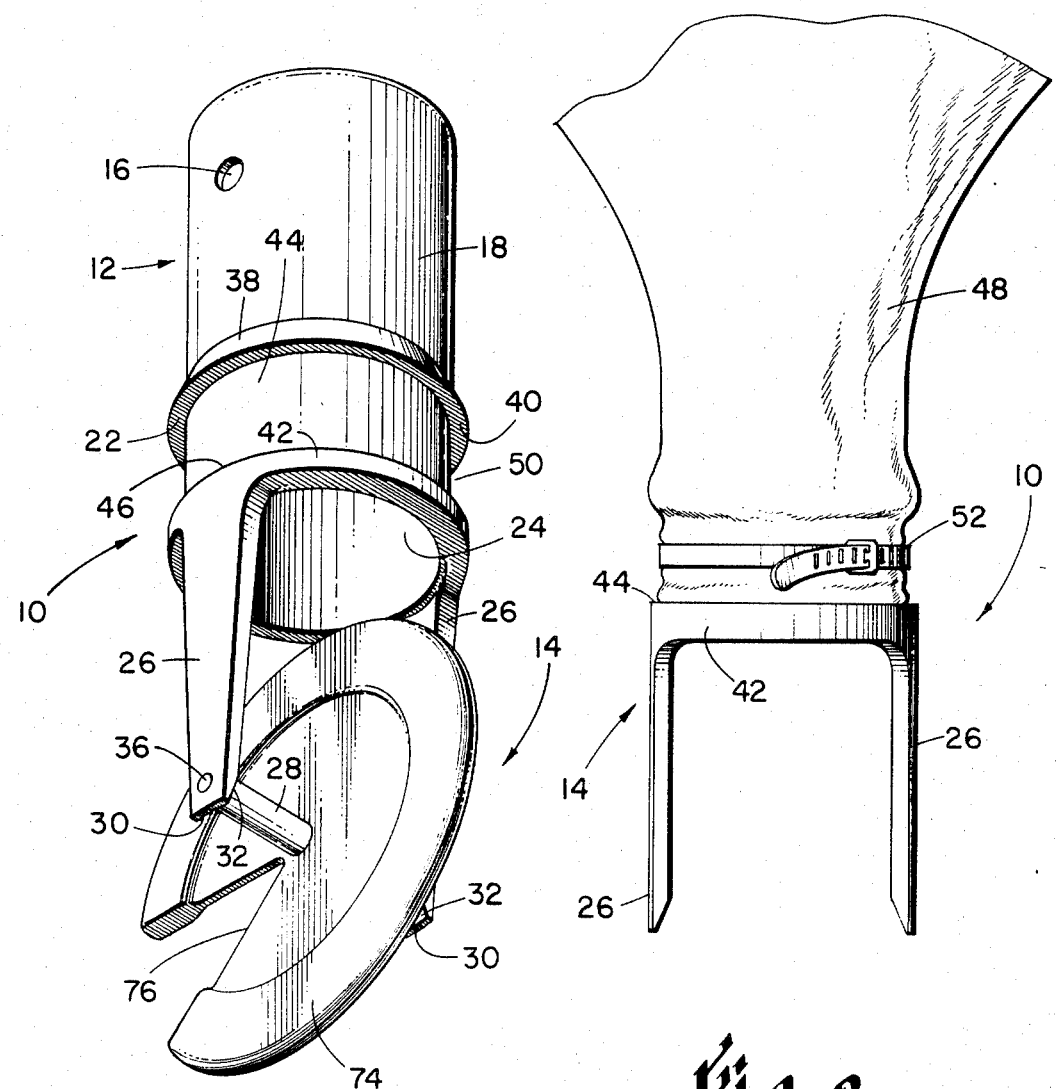
FIG. 1 is a perspective view of the combination balloon-inflation and load-deployment apparatus.
FIG. 2 is a front elevation of the one-way valve portion thereof showing the latter secured within the neck of a balloon.

Referring next to the drawings for a detailed description of the present invention and, initially, to FIGS. 1 and 3 for this purpose, reference numeral 10 has been selected to broadly identify the combination balloon-inflation and load-lowering device in its entirety while numerals 12 and 14 similarly identify the one-way valve and notched flywheel subassemblies thereof. The one-way valve in FIG. 3 will be seen to comprise an inverted generally cup-shaped member having one or more apertures 16 in its cylindrical body 18 adjacent the closed top 20. In the particular form shown, an annular rib 22 encircles the body approximately two-thirds of the way down to its open lower end 24 where the downwardly-directed arms 26 that journal the shaft 28 of the flywheel subassembly 12 are located. These arms lie in transversely-spaced essentially parallel relation to one another and are formed integral with the valve body. The free ends 30 of both arms are chamfered on the inside tip ends as indicated at 32 so as to spring these arms apart slightly when the flywheel shaft 28 is passed upwardly therebetween preparatory to entering the transversely-aligned holes 34 provided for the reduced diameter sections 36 on the shaft ends.

Annular rib 22 includes a downwardly-flared annular surface 38 that emerges from the cylindrical valve body and terminates where it intersects downwardly-facing shoulder 40 at the lower edge thereof which returns to the surface of the body. Spaced beneath the annular rib 18 is a second integrally-formed annular rib 42 from which the arms 26 emerge. The upper surface of rib 42 comprises an upwardly-facing annular shoulder 44 that cooperates with the opposed shoulder 40 thereabove to bracket section 46 of the valve body in between, the latter having been most clearly shown in FIG. 1.

In FIGS. 2, 3 and 4 to which detailed reference will next be made, it can be seen that the neck 48 of the balloon stretches and expands to slide down over the chamfered surface 38 of the upper annular rib 22 before seating in the annular groove 50 defined between the opposed shoulders 40 and 44 bracketing section 46 of the valve body. The neck of the balloon is secured to the valve body by passing strap tie 52 around that portion thereof within groove 50. Tie 52, of course, seals the lifting gas inside the balloon. With the neck of the balloon thus secured, it can be inflated in the manner which will now be described in connection with FIG. 3.

Before the flywheel subassembly 14 is added to the one-way valve subassembly 12 in the manner previously-described, an inflation stem indicated in a general way by reference numeral 54 is placed up inside of the inverted cup-shaped body of the valve as shown. In the form illustrated, stem 54 has a cylindrical body 56 sized to fit loosely up inside the valve body. Stem body 56 is encircled by an annular O-ring groove 58. O-ring 60 seated in groove 58 forms a continuous annular air-tight seal against the inside of the valve body in the usual manner. A tubular extension 62 formed integral with the stem body projects beneath the lower end of the latter and provides the means for attaching the hose [not shown] which, in turn, is connected to the source of pressurized lifting gas used to inflate the balloon. Blind axial bore 64 extending up through the extension and the body of the stem terminates near the upper extremity thereof in transverse bore 66 which opens at both ends on a section of reduced diameter 68 which is spaced inside the opposed surface of the valve body containing the apertures 16.

In FIGS. 2 and 4 the neck 48 of the balloon will be seen collapsed against the outer surface of the valve body where it covers and seals the apertures 16 entering the latter. With the stem removed, it is this feature along with, of course, the closed end 20 of the valve body that keeps the gas inside the balloon during flight with the stem 54 removed. During the inflation process illustrated in FIG. 3, the gas under pressure entering the bore 64 of the stem passes into the annular space between the outside of its reduced diameter section 68 and the opposed surface inside the valve body by means of the transverse bore 66. It will then pass out through the apertures 16 of the one-way valve expanding the balloon neck as shown and allowing the lifting gas to enter. Once the balloon is filled and the pressure removed the system will, of course, revert to the condition shown in FIGS. 2 and 4. The final step in the inflation process is to remove the stem. The manner in which the load 70 is attached and deployed will now be described in detail with particular reference to FIGS. 1 and 4.

Once the stem has been removed the flywheel subassembly 14 can be snapped in place between the depending arms of the one-way valve subassembly 12 in the manner that has been previously described. The shoulders separating the reduced diameter end sections 36 of the main flywheel shaft 28 cooperate with the spring arms 26 which upon being spread apart exert a slight inward bias thereagainst that keeps the flywheel subassembly securely in place while, at the same time, allowing it to rotate freely back and forth in the manner soon to be set forth in detail.

Load 70 is representative of a sonde or other device to be carried aloft by a balloon. The better practice is to launch the sonde as close as practicable to the underside of the balloon, but subsequently deploy same at a distance of 35 to 40 meters therebeneath so that the balloon does not shield or otherwise interfere with the action of the sonde. Applicant's unique method and apparatus for accomplishing the above is, first of all, to string a so-called "flight train" or, more commonly, a tether 72 between the letdown device 14 and the load 70. On the lower end, the tether is securely fastened to the sonde and on the upper end it is attached to the flywheel shaft 28 alongside the flywheel 74. It will be seen in FIG. 4 that the flywheel is offset to one side or the other of the midpoint of shaft 28 where the end of the tether 72 is fastened, the reason being that once the load is fully deployed it, obviously should hang on the vertical axis of the system as nearly as possible so as to not introduce an off-center moment. This is best accomplished by moving the flywheel to one side of center and starting the tether at the midpoint.

Flywheel 72 has a pie-shaped segment taken out of the edge to provide a notch through which the tether is reaved back and forth from one side of the flywheel to the other as shown in FIG. 4 after taking one or more turns around the shaft in opposite directions. If, for example, one turn around the shaft is taken clockwise on the right side of the flywheel and a second single turn is taken counterclockwise on the left side of the flywheel after being taken through the notch 74, and this sequence is repeated over and over again until the tether is all wound upon the shaft, then the load will deploy automatically by itself at its slowest rate when the flywheel flip-flops to-and-fro once each revolution. On the other hand, if the load is to be deployed more quickly, then instead of a single turn around the shaft on each side of the flywheel, two or more turns can be taken so that the shaft will make more than one revolution before it reverses direction thus lowering the load more quickly to the end of its tether. In FIG. 4, the phantom-line representation reveals the tether in the position it will occupy essentially on the vertical axis of the system when the load is fully deployed even though the load as illustrated has not yet reached this position. The full line position, on the other hand, shows the approximate location of the tether and the load suspended therebeneath when the tether is unwinding off the right end of the flywheel shaft. Actually, of course, the flip-flop action of the flywheel is so rapid and the lateral shift of the tether so slight that no appreciable sidewise movement of the load will take place. Instead, the progression of the load will be essentially downward along the vertical axis of the train.

All parts of the assembly with the exception of the tether and, perhaps, the strap tie 52 are fabricated from lightweight materials, preferably plastic. While lightweight metals like, for example, aluminum and magnesium could be substituted for plastic and, as far as functional considerations are concerned, would work quite well, their disadvantages in terms of increased fabrication expense and weight mitigate against their use. The apparatus just described is very simple and can be operated by one person without assistance in all but the most adverse weather conditions involving high winds.

What is claimed is:

1. A balloon inflation and load-lowering device comprising in combination: an inverted generally cup-shaped member having a closed upper end, an open lower end, at least one side-opening port between the ends thereof, and a pair of springable arms hanging down beneath said open lower end in transversely-spaced substantially parallel relation to one another, said member being sized for insertion into the elastic neck of a balloon so as to expand same and cooperate therewith when so inserted and with a neck-encircling tie therearound to define a gas-retaining plug therefor, said member being also adapted to receive and releasably retain in gas-tight sealed relation within the open lower end thereof a tubular nozzle for introducing a lifting gas under pressure into the interior of a balloon, and said member being further effective upon the introduction of a lifting gas under pressure therein through said nozzle to expand the neck of a balloon adjacent said side-opening port for inflating the latter; and, a load-letdown and load-tethering assembly detachably connectable between the arms of the cup-shaped member following removal of the nozzle therefrom, said assembly including a shaft mountable between said arms for rotation about a substantially horizontal axis, a wheel having a radially-extending notch in the edge thereof mounted intermediate the ends of said shaft for conjoint rotation therewith, and a load-supporting filament defining a tether having one end attached to the shaft and the other end connectable to a load, said tether when foreshortened becoming effective to raise a load attached to said tether into closer proximity to a balloon attached thereto for lifting same into the air, said foreshortening taking place upon said tether being first wound around the shaft one or more turns in one direction on one side of the wheel, next passed through the notch therein and wound one or more turns in the opposite direction on the other side of the wheel and finally passed back through the notch to said one side of the wheel sequentially over and over again, and said load upon being released to hang freely beneath a balloon for lifting same cooperating with said tether and with said shaft and wheel subassembly to first turn the latter one or more turns in one direction before reversing and turning same one or more turns in the opposite direction until said tether is unwound and the resulting flip-flop action has slowly lowered the load to a position spaced beneath the balloon.

2. The combination as set forth in claim 1 in which: the radially-extending notch in the wheel is pie-shaped.

3. The combination as set forth in claim 1 in which: the wheel is laterally offset on the shaft closer to one of said arms than the other.

4. The combination as set forth in claim 1 in which: the tether is wound a single turn around the shaft on each side of the wheel before being passed through the notch.

5. The combination as set forth in claim 1 in which: the tether is wound at least two turns around the shaft on each side of the wheel before being passed through the notch.

6. The combination as set forth in claim 1 in which: the length of the shaft is greater than the distance separating the arms, and in which the springable arms have free ends carrying opposed chamfered surfaces shaped to cam said arms apart and receive the shaft and wheel subassembly upon insertion of said shaft therebetween.

7. The combination as set forth in claim 3 in which: the said one end of the tether is attached to the shaft alongside the wheel substantially midway between the arms.

8. The subcombination for use with a balloon inflation device for both tethering a load beneath a balloon and lowering said load at a controlled rate to the end of said tether which comprises: a load-letdown and load-tethering assembly connectable to said inflation device, said assembly including a shaft mountable for rotation about a substantially horizontal axis, a wheel having a radially-extending notch is the edge thereof mounted intermediate the ends of said shaft for conjoint rotation therewith, and a load-supporting filament defining a tether having one end attached to the shaft and the other end connectable to a load, said tether when foreshortened becoming effective to raise a load attached to said tether into closer proximity to a balloon for lifting same into the air, said foreshortening taking place upon said tether being first wound around the shaft one or more turns in one direction on one side of the wheel, next passed through the notch therein and wound one or more turns in the opposite direction on the other side of the wheel and finally passed back through the notch to said one side of the wheel sequentially over and over again, and said load upon being released to hang freely beneath a balloon for lifting same cooperating with said tether and with said shaft and wheel subassembly to first turn the latter one or more turns in one direction before reversing and turning same one or more turns in the opposite direction until said tether is unwound and the resulting flip-flop action has slowly lowered the load to a position spaced beneath the balloon.

9. The improved method for suspending a load underneath a balloon used for lifting same into the air and subsequently lowering said load to the end of a tether which comprises the steps of: journalling a shaft mounting a notched wheel for rotation about a substantially horizontal axis beneath the neck of the balloon through which it is inflated following inflation thereof with a lifting gas, attaching one end of a tether to the shaft alongside the wheel and the other end to the load, foreshortening the tether to bring the load into close proximity to the balloon by first taking one or more turns of the tether around one end of the shaft in one direction on one side of the wheel, next passing the tether through the notch in the wheel onto the other end of the shaft preparatory to taking one or more turns therearound in the opposite direction, and finally passing the tether back through the notch again onto the said one end of the shaft before repeating the sequence over and over again until substantially all the tether is wound upon said shaft, launching the balloon and allowing the load to hang therebeneath such that the weight thereof causes the shaft and wheel to flip-flop back and forth until the tether completely unwinds at a controlled rate.

10. The method as set forth in claim 9 which includes the steps of: offsetting the wheel toward one end of the shaft and attaching the tether at the midpoint of the latter.

11. The method of deploying a load suspended beneath a balloon which includes the steps of inserting an inverted generally cup-shaped inflation device with a side-opening port and a pair of disk-supporting arms therebeneath into the neck of a balloon and fastening same therein, inflating the balloon through the open end of said cup-shaped device by applying sufficient inflation pressure thereto to expand the neck of the balloon and uncover the port, removing the pressure from the balloon allowing the expanded neck thereof to collapse against said port and seal the pressurizing gas therein, attaching the ends of a shaft mounting a notched disk for rotation about a substantially horizontal axis between said arms, attaching one end of a load-supporting tether to the shaft wrapping the tether clockwise one or more turns around the shaft on one side of the disk, then passing the tether through the notch and taking one or more turns anti-clockwise around the shaft on the opposite side of the disk, and alternately repeating the aforementioned sequence until the free end of the tether terminates adjacent the disk, and attaching a load to the free end of the tether such that upon release of the load to fall freely it will pull upon the tether and cause the disk to flip-flop back and forth and the tether will slowly unwind off the shaft and lower the load.

* * * * *